(12) United States Patent
Kajino (10) Patent No.: US 7,733,468 B2
(45) Date of Patent: Jun. 8, 2010

(54) LENS METER

(75) Inventor: Tadashi Kajino, Okazaki (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 12/071,260

(22) Filed: Feb. 19, 2008

(65) Prior Publication Data

US 2008/0204727 A1 Aug. 28, 2008

(30) Foreign Application Priority Data

Feb. 28, 2007 (JP) ............... 2007-050813
Feb. 5, 2008 (JP) ............... 2008-025638

(51) Int. Cl.
*G01B 9/00* (2006.01)
(52) U.S. Cl. ..................... 356/124
(58) Field of Classification Search ............ 356/124, 356/326; 351/206, 214
See application file for complete search history.

(56) References Cited

U.S. PATENT DOCUMENTS

| | | | |
|---|---|---|---|
| 3,880,525 A | | 4/1975 | Johnson |
| 5,379,111 A * | | 1/1995 | Kajino et al. ............... 356/124 |
| 6,236,453 B1 | | 5/2001 | Ikezawa et al. |
| 6,657,710 B2 | | 12/2003 | Kajino et al. |
| 6,972,837 B2 * | | 12/2005 | Kajino ............... 356/124 |
| 7,209,224 B2 * | | 4/2007 | Kajino ............... 356/124 |
| 7,245,362 B2 * | | 7/2007 | Kobayashi et al. ............ 356/124 |
| 2003/0030789 A1 * | | 2/2003 | Kajino et al. ............... 356/124 |
| 2003/0043367 A1 * | | 3/2003 | Kajino ............... 356/124 |
| 2004/0174533 A1 | | 9/2004 | Nakauchi |
| 2005/0237514 A1 * | | 10/2005 | Kobayashi et al. ............ 356/124 |
| 2008/0062410 A1 | | 3/2008 | Divo et al. |
| 2009/0021725 A1 * | | 1/2009 | Kajino ............... 356/124 |

FOREIGN PATENT DOCUMENTS

| | | |
|---|---|---|
| EP | 1 251 401 A1 | 10/2002 |
| FR | 2 880 118 A1 | 6/2006 |
| JP | A 60-17335 | 1/1985 |
| JP | A-2001-124662 | 5/2001 |

OTHER PUBLICATIONS

Feb. 4, 2010 Extended Search Report issued in EP 08 15 1684.

* cited by examiner

*Primary Examiner*—Tarifur R. Chowdhury
*Assistant Examiner*—Isiaka O Akanbi
(74) *Attorney, Agent, or Firm*—Oliff & Berridge PLC (57) ABSTRACT

A lens meter capable of obtaining optical characteristics of a lens with high stability and accuracy has a measurement optical system including a target panel having measurement targets having first measurement targets and second measurement targets and a photodetector which photo-receives a measurement light bundle, a calculation means which calculates the optical characteristics including first calculation means which calculates first optical characteristics based on a detection result of the first measurement targets by the photodetector and second calculation means which calculates second optical characteristics based on a detection result of the first and second measurement targets, and display control means which displays the second optical characteristics as the optical characteristics of the lens if the calculation result by the first calculation means or the detection result by the photodetector satisfies a predetermined condition and displays the first optical characteristics if the predetermined condition is not satisfied.

8 Claims, 5 Drawing Sheets

LENS METER

BACKGROUND OF THE INVENTION

1. Field of the Invention

The present invention relates to a lens meter which measures optical characteristics of a lens to be examined.

2. Description of Related Art

Conventionally, there is known a lens meter having a measurement optical system which projects a measurement light bundle onto a lens to be examined, detects the measurement light bundle transmitted through the lens by a photodetector, and obtains optical characteristics (sphere power S, cylinder power C, and an astigmatic axial angle A) of the lens based on results of the detection. Such a conventional lens meter is configured such that the optical characteristics of the lens are measured based on deviations of a group of four measurement targets (three measurement targets in principle) which are arranged around a measurement optical axis, the deviations detected by the photodetector (see Japanese Patent Application Unexamined Publication No. Sho60-17335 and U.S. Pat. No. 3,880,525 corresponding to Japanese Patent Application Unexamined Publication No. Sho50-145249). In addition, a lens meter is proposed which uses a plurality of measurement targets arranged in a nosepiece in order to facilitate measurement of distribution of optical characteristics of a lens and a distance portion and a near portion of a progressive power lens (see U.S. Pat. No. 6,972,837 corresponding to Japanese Patent Application Unexamined No. 2003-75296). As for any lens meters, measurement of a single vision lens is performed basically by using measurement targets arranged on a circumference of a circle having a diameter of 2 to 3 mm around the measurement optical axis, because the further the measurement targets are arranged from the measurement optical axis, the greater influence of aberration.

However, in measurement based on the measurement targets in the vicinity of the measurement optical axis, measurement of optical characteristics become unstable depending on power of a lens and conditions of a lens surface, which may cause unfavorable reliability of measurement accuracy. In other words, when refractive power of the lens is weak, deviations of the measurement targets in the vicinity of the optical axis are small, and thereby measurement values tend to be unstable. Specifically, when the cylinder power is weak, the astigmatic axial angle influenced thereby greatly varies, causing unstable results of the measurement and low measurement accuracy. In addition, in the measurement using the measurement targets in the vicinity of the measurement optical axis, when there is a scratch or soil in a measurement region, measurement values become unstable, causing unfavorable reliability of measurement accuracy.

SUMMARY OF THE INVENTION

An object of the invention is to provide a lens meter capable of obtaining optical characteristics of a lens with high stability and accuracy.

To achieve the objects and in accordance with the purpose of the present invention, a lens meter which measures optical characteristics of a lens has a measurement optical system including a target panel having a plurality of measurement targets which are arranged in a predetermined pattern around a measurement optical axis, the measurement targets having at least first measurement targets in a first region in the vicinity of the measurement optical axis and second measurement targets in a second region outside the first region and a photodetector which photo-receives a measurement light bundle passing through the lens, a calculation means which calculates the optical characteristics including first calculation means which calculates first optical characteristics of the lens based on a detection result of the first measurement targets by the photodetector and second calculation means which calculates second optical characteristics of the lens based on the detection result of the first measurement targets and a detection result of the second measurement targets, and display control means which displays the second optical characteristics as the optical characteristics of the lens if one of a calculation result by the first calculation means and the detection result by the photodetector satisfies a predetermined condition, and displays the first optical characteristics as the optical characteristics of the lens if the predetermined condition is not satisfied.

Additional objects and advantages of the invention are set forth in the description which follows, are obvious from the description, or may be learned by practicing the invention. The objects and advantages of the invention may be realized and attained by the lens meter in the claims.

BRIEF DESCRIPTION OF THE DRAWINGS

The accompanying drawings, which are incorporated in and constitute apart of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
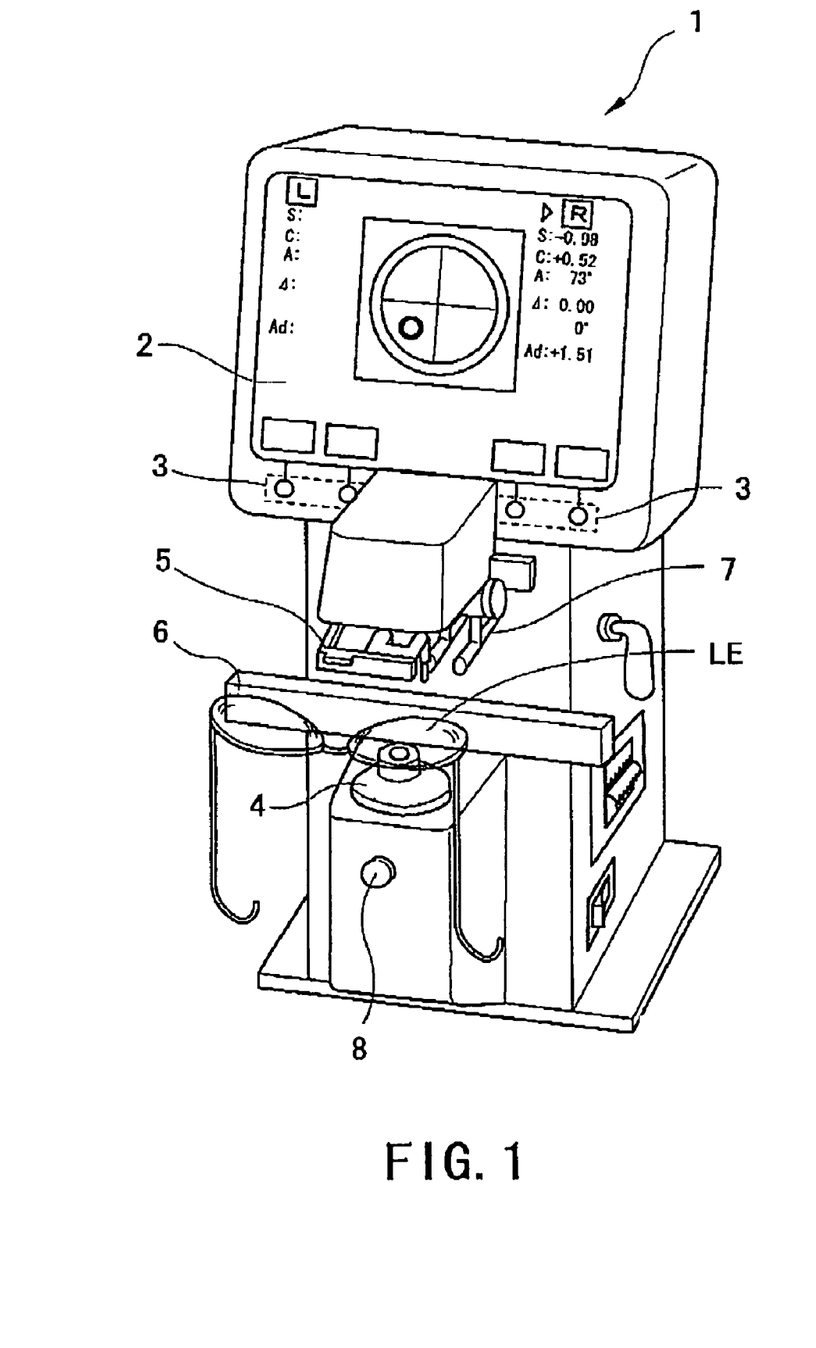
FIG. 1 is an external view for illustrating a lens meter according to a preferred embodiment of the present invention.

A detailed description according to preferred embodiments of the present invention is provided below with reference to the accompanying drawings. FIG. 1 is an external view for illustrating a lens meter according to a preferred embodiment of the present invention.

Reference numeral 1 is a main body of the lens meter. On a display 2, which is a liquid crystal display or others, measurement results and information required for measuring a target for alignment and other objects are displayed. By pressing one of switches 3 for input corresponding to switch displays on the display 2, necessary instructions such as switching of measurement modes are inputted. A nosepiece 4, on which a lens LE to be examined is mounted, is a reference point for measurement. A lens holder 5 is moved downward to stably hold the lens LE mounted on the nosepiece 4.

When measuring a lens in frames, a frame table 6 movable in a back-and-forth direction is brought into contact with lower parts of the frames (lower parts at the time of wearing spectacles) so as to gain stability, whereby a reference for measurement of an astigmatic axial angle is provided. A marking mechanism 7 is used to make a mark on the lens LE. A READ switch 8 is used to read data of optical characteristics of the lens LE. When the READ switch 8 is pressed, measurement values are held still on the display 2 and stored in the lens meter.

Figure 2:
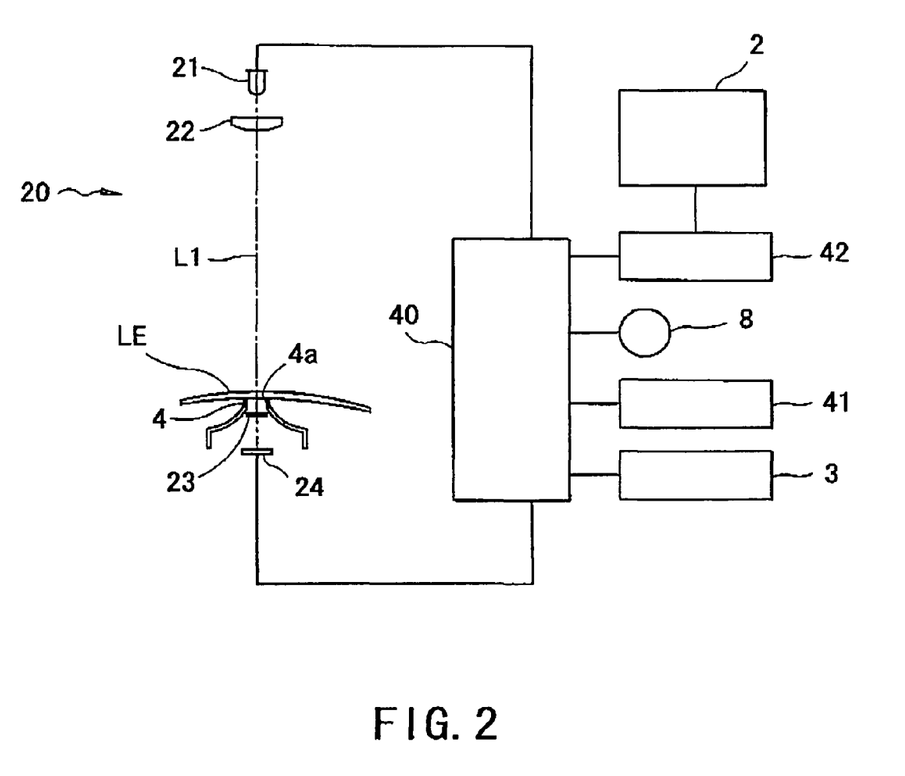
FIG. 2 is a view for illustrating an optical system and a control system of the lens meter according to the preferred embodiment of the present invention.

FIG. 2 is a view for illustrating an optical system and a control system of the lens meter Reference numeral L1 is a measurement optical axis of a measurement optical system 20. The measurement optical system 20 has a measurement light source 21, such as an LED, a collimating lens 22, a grid panel 23 on which measurement targets are formed, and a two-dimensional image sensor 24 as a photodetector, which are arranged on the optical axis L1. The optical axis L1 passes through the center of an aperture 4a of the nosepiece 4 and is arranged perpendicular to a plane of the aperture 4a. The grid panel 23 is arranged in the vicinity of the aperture 4a of the nosepiece 4. The distance between the image sensor 24 and the upper end of the nosepiece 4 (the back vertex of the lens LE) is designed to be shorter than the shortest focal length in a measurement region of the lens LE.

The grid panel 23 may be arranged on the light source 21 side of the lens LE mounted on the nosepiece 4. In addition, the light source 21 may be arranged two-dimensionally such that measurement light bundles equivalent to those passing through the grid panel 23 can be obtained.

Figure 3:
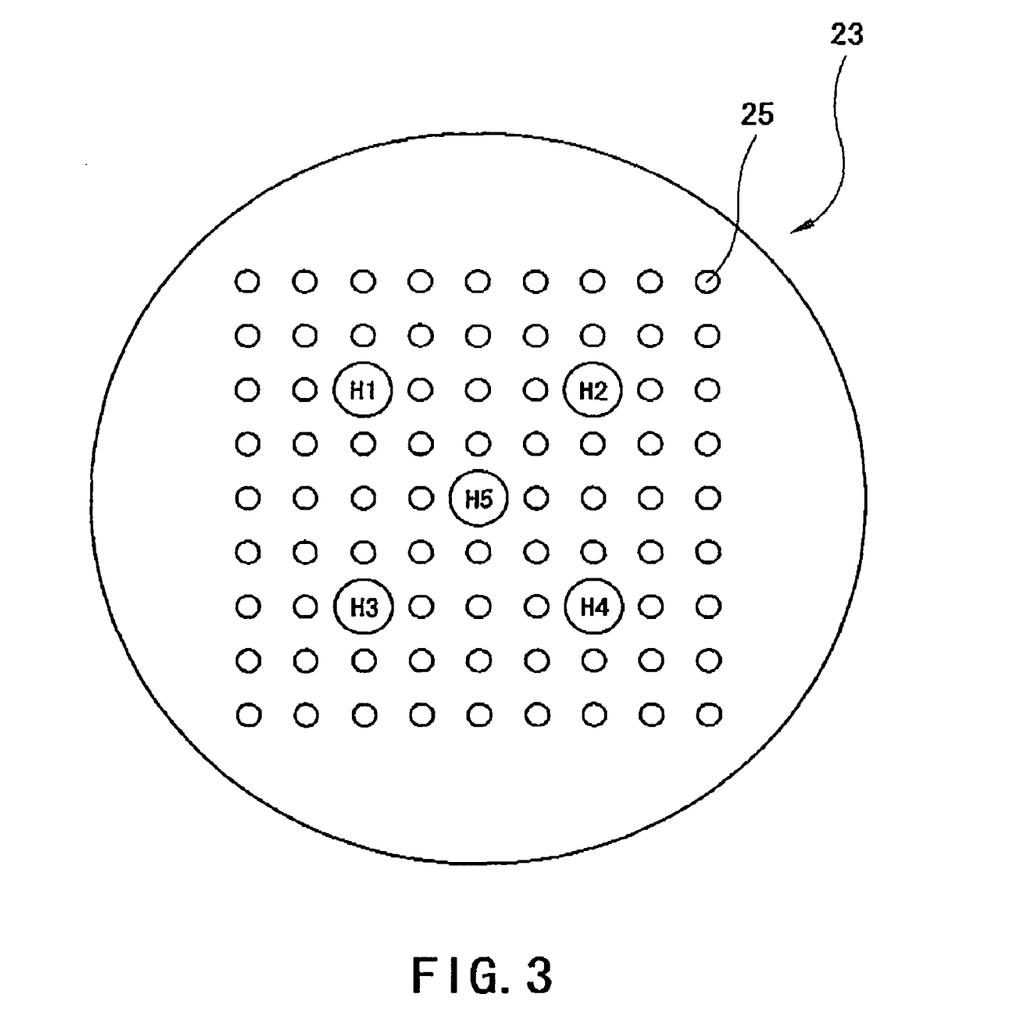
FIG. 3 is a view for illustrating a target pattern of measurement targets.

FIG. 3 is a view for illustrating a target pattern of the measurement targets on the grid panel 23. In this example, a plurality of circular pinholes 25 (dot targets) as a measurement target are geometrically arranged at intervals of 0.5 mm in a lattice-like configuration. The pinholes 25 are arranged in nine rows and nine columns. However, a larger number of the pinholes 25 may be arranged within a region where the measurement light passes through the aperture 9a of the nosepiece 4. In addition, the pinholes 25 are evenly spaced at intervals of 0.5 mm between the centers of the pinholes 25. However, it is not limited to the above-described arrangement provided that a predetermined geometrical arrangement is adopted. Of the pinholes 25, a pinhole H5 on the optical axis L1 and pinholes H1, H2, H3 and H4 which are positioned on corners of a 2 mm square around the pinhole H5, have a diameter of 0.5 mm. The pinholes 25 other than the pinholes H1 to H5 have a diameter of 0.2 mm. The pinhole H5 in the center and the pinholes H1 to H4 which are arranged in a predetermined relation to the pinhole H5, are detected as distinguished from other pinholes 25 having a different size. The pinhole H5 in the center is used to detect a reference position of deviations of the pinholes 25, the deviations photo-received on the image sensor 24. If the pinhole H5 in the center is not detected properly due to a scratch or soil on the lens LE, the pinholes H1 to H4 are used as substitutes. In addition, a set of the pinholes H1 to H4 are positioned in a region where measurement can be performed even when a small-diameter nosepiece for contact lenses is used.

Light bundles from the light source 21 are made into parallel light bundles by the collimating lens 22 and projected onto the lens LE. Of the light bundles transmitted through the lens LE, the light bundles passing through the pinholes 25 on the grid panel 23 arrive on the image sensor 24. An output signal from the image sensor 24 is inputted in a control part 40. The control part 40 is connected with a memory 41 for storing calculation results and a display circuit 42 for displaying information such as calculation results on the display 2.

The control part 40 calculates optical characteristics (sphere power S, cylinder power C, an astigmatic axial angle A, prism diopter) of the lens LE based on positional deviations of the measurement targets which are obtained when the lens LE having refractive power is mounted, with respect to positions of images of the pinholes 25 (measurement targets) which arrive on the image sensor 24 via the grid panel 23 when the lens LE is not mounted. Basically, in a case where a lens LE having only sphere power S is mounted, compared with a case where the lens LE is not mounted, the images of the pinholes 25 deviate outward or inward in an annular shape with respect to the optical center of the lens LE. The sphere power S is obtained based on the outward or inward deviations of the images. When a lens LE having only cylinder power C is mounted, the positions of the images of the pinholes 25 deviate outward or inward with respect to the cylinder axial center of the lens LE. The cylinder power C is obtained based on the outward or inward deviations of the images. The astigmatic axial angle A is obtained as the center axis of the deviations. In addition, the prism power is obtained based on a translation amount of the image of the pinhole H5 or the images of the pinholes in the vicinity thereof. A lens LE having both the sphere power S and the cylinder power C may be regarded as a combination of the above lenses (the power can be obtained in manners similar to those described in Japanese Patent Application Unexamined Publication No. Sho60-17335 and U.S. Pat. No. 3,880,525 corresponding to Japanese Patent Application Unexamined Publication No. Sho50-145249).

When using a plurality of measurement targets, optical characteristics of a single vision lens can be accurately obtained by using the measurement targets such as twenty-five measurement targets in five rows and five columns, forty-nine measurement targets in seven rows and seven columns arranged within a diameter of 2 to 3 mm around the measurement optical axis L1, making three or four targets one group, the targets arranged on the same circumference and preferably adjacent to each other, and calculating an average of the optical characteristics of all the groups. The optical characteristics may also be calculated by obtaining best-fit regression planes of the sphere power S, the cylinder power C, and the astigmatic axial angle A by applying a least-square method and by using a ray tracing method based on a detection result of deviations of the measurement targets such as twenty-five measurement targets in five rows and five columns and forty-nine measurement targets in seven rows and seven columns. The optical characteristics of the single vision lens can be accurately obtained by using a larger number of the measurement targets than those in conventional calculation in which optical characteristics are calculated based on only a group of three or four measurement targets.

When measuring a progressive power lens, distribution of optical characteristics in a minute region of the progressive power lens can be obtained by calculating the optical characteristics of a group of four (at least three) adjacent measurement targets (the pinholes 25). In other words, distribution of optical characteristics within the nosepiece aperture 4a of the nosepiece 4 can be obtained. Therefore, in measurement of the progressive power lens, it is possible to efficiently determine whether or not a current measurement position is in a distance portion. Similarly, it is possible to efficiently determine whether or not the current measurement position is in a near portion.

In measurement of the optical characteristics of the single vision lens, the further the pin holes 25 that define measurement targets are arranged from the measurement optical axis L1, the greater influence of aberration. Therefore, the optical characteristics of the lens LE are basically calculated using at least three measurement targets arranged in a small region (a region of 2 to 3 mm in diameter) in the vicinity of the pinhole H5 in the center on which the measurement optical axis is positioned (a first calculation). For example, the optical characteristics are calculated based on the detection results based on the twenty-five measurement targets in five rows and five columns or the forty-nine measurement targets in seven rows and seven columns around the pinhole H5. However, in measurement using the measurement targets in the vicinity of the measurement optical axis L1, when refractive power of the lens LE is weak, deviations of the measurement targets are small, and accordingly measurement values tend to be unstable, causing unfavorable reliability of measurement accuracy. Especially, when the cylinder power C is weak, calculation results of the astigmatic axial angle become unstable, causing unfavorable reliability of measurement accuracy.

Hence, the lens meter according to the preferred embodiment of the present invention calculates the optical characteristics by expanding a measurement region and increasing the number of the measurement targets with respect to the small region (the region of 2 to 3 mm in diameter) in the vicinity of the measurement optical axis L1 if the cylinder power C is a predetermined weak diopter or less (a second calculation). If the cylinder power C is weak, influence of aberration is small even when the measurement region is expanded with respect to the measurement optical axis L1. Therefore, by increasing the number of the measurement targets, measurement accuracy of the astigmatic axial angle can be improved and stabilized. Hereinafter, an operation example is described with reference to the flow chart in FIG. 4.

The lens meter has a mode of measuring a single vision lens and a mode of measuring a progressive power lens, and the mode of measuring a single vision lens is selected in the description below. An examiner selects a right or left lens to be measured, by pressing a switch for specifying the right or left lens to be displayed on the display 2.

Figure 4:
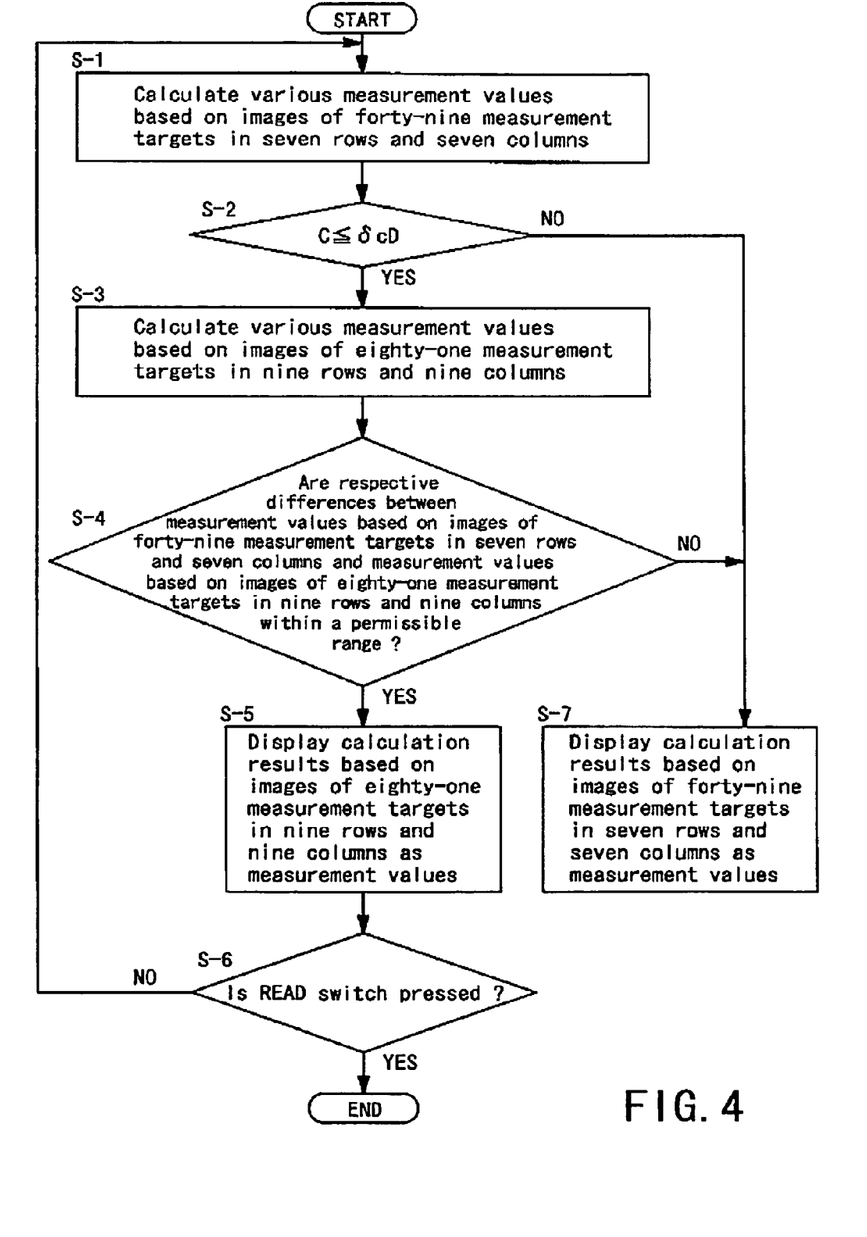
FIG. 4 is a flow chart showing an operation example according to the preferred embodiment of the present invention.
Figure 5A:
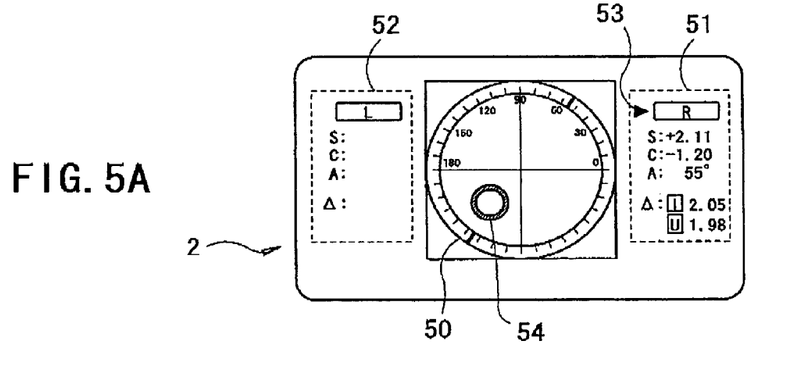
FIGS. 5A, 5B and 5C are views for illustrating a display screen for alignment.

When the lens LE is mounted on the nosepiece 4, the control part 40 calculates various measurement values (the sphere power S, the cylinder power C, the astigmatic axial angle A, and the prism diopter) based on deviations of images of forty-nine measurement targets in seven rows and seven columns, which are arranged around the optical axis L1, of a plurality of images of the measurement targets (images of the pinholes 25) detected by the image sensor 24 (S-1). FIG. 5A is a view for illustrating a display screen for alignment displayed on the display 2 at this time. Reference numeral 50 is a reticle for alignment, and measurement value display parts 51 and 52 display measurement values of the right and left lenses respectively. A mark 53 indicates that the right lens is currently measured. The various measurement values obtained at this time are displayed in the measurement value display part 51 on the right. In addition, a ring target 54 is displayed on the display 2 based on a deviation direction of the optical center of the lens LE with respect to the optical axis L1 and a deviation amount that defines the prism diopter. Alternatively, alignment may be performed by obtaining a display position of the ring target 54 based on detection results of the pinholes H1 to H5.

Figure 5B:
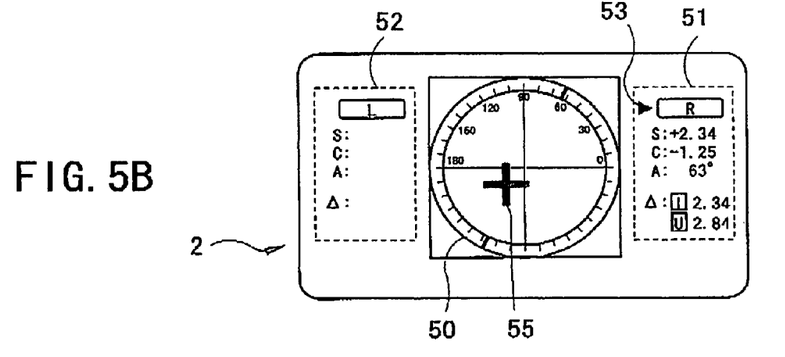
Figure 5C:
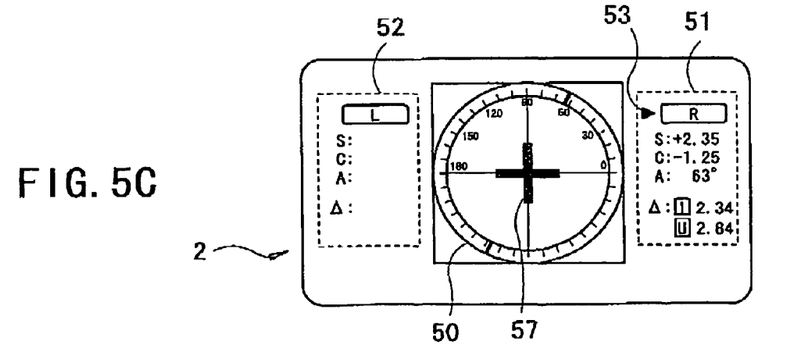

When the lens LE is moved and the prism diopter becomes less than 0.5Δ, the ring target 54 is changed to a cross-lined target 55 (see FIG. 5B). When measuring the diopter only, the measurement value is held still on the display 2 by pressing the READ switch 8 in this state. When making a mark on the lens LE, the lens LE is moved so that the cross-lined target 55 moves toward the center of the reticle 50 for more accurate alignment, and when the prism diopter becomes less than 0.1Δ, the cross-lined target 55 is changed to a large cross-lined target 57, which notifies the examiner that accurate alignment is completed.

In the foregoing measurement of the single vision lens, the control part 40 continuously calculates the optical characteristics at fixed time intervals. Of the optical characteristics obtained based on the deviations of the images of the forty-nine measurement targets in seven rows and seven columns arranged around the optical axis L1, the control part 40 determines whether or not the cylinder power is a predetermined weak diopter δcD (and a sphere power is a predetermined weak diopter εsD, D: diopter) or less (S-2). For example, a weak diopter of −0.5 D (placing a minus sign in front of the cylinder power) or less is set as the predetermined weak diopter δcD.

When the cylinder power is the predetermined weak diopter δcD (and the sphere power is the predetermined weak diopter εsD) or less, influence of aberration is small even when the measurement region is expanded and the number of the measurement targets is increased, and thus the optical characteristics are calculated by expanding the measurement region and increasing the number of the measurement targets with respect to the forty-nine target in seven rows and seven columns which are normally used, in order to stabilize the measurement values and to improve accuracy of the astigmatic axial angle. Besides the calculation of the optical characteristics based on the forty-nine pinholes 25 in seven rows and seven columns, the control part 40 expands the measurement region and increases the number of the measurement targets to calculate optical characteristics based on images of eighty-one measurement targets in nine rows and nine columns around the pinhole H5 (S-3).

It is preferable to provide a further condition for determination as described below (alternatively, the following determination condition may be used as a single condition). The control part 40 compares measurement values calculated based on the forty-nine measurement targets in seven rows and seven columns with measurement values calculated based on the eighty-one measurement targets in nine rows and nine columns. After the measurement values are compared, it is determined whether or not respective differences between the above-described measurement values are within a permissible range (S-4) In the preferred embodiment of the present invention, if both the differences between the sphere powers and between the cylinder powers are within a permissible range of ±0.06 D, it is considered that influence of aberration caused by expanding the measurement region and increasing the number of the measurement targets is small, and more reliable measurement values can be obtained by calculating the measurement values based on the images of the eighty-one measurement targets in nine rows and nine columns. Therefore, the control part 40 displays calculation results on the display 2 based on the images of the eighty-one measurement targets in nine rows and nine columns (S-5). At a press of the READ switch 8, the control part 40 holds the measurement values still on the display 2 and stores them in the memory 41 (S-6).

If the difference between the sphere powers or between the cylinder powers is outside the permissible range of ±0.06 D after comparing the measurement values based on the images of the forty-nine measurement targets in seven rows and seven columns with the measurement values based on the images of the eighty-one measurement targets in nine rows and nine columns, it is considered that the stability of the measurement values cannot be improved, and thus the control part 40 displays the calculation results based on the images of the forty-nine measurement targets in seven rows and seven columns as measurement values (S-7).

If the cylinder power is stronger than the predetermined weak diopter δcD in the step S-2 described above, the influence of the aberration becomes larger when the calculation based on the images of the eighty-one measurement targets in nine rows and nine columns arranged around the optical axis L1 is performed, and the calculation results based on the images of the forty-nine measurement targets in seven rows and seven columns can secure the reliability of the accuracy. Therefore, simply the calculation results based on the images of the forty-nine measurement targets in seven rows and seven columns are displayed as measurement values (S-7).

In the determination in the step S-4 described above, the determination of switching between the calculation results based on the images of the forty-nine measurement targets in seven rows and seven columns and those based on the images of the eighty-one measurement targets in nine rows and nine columns may be made based on results obtained by performing both the calculations more than one time (e.g. three times). If differences in respective measurement values between both the calculations are within the permissible range of ±0.06 D, and dispersions in respective measurement values obtained in three consecutive calculations are also within the permissible range of ±0.06 D, it is considered that stabilization of the measurement values and accuracy of the astigmatic axial angle are attainable, and thus thereafter the measurement results calculated based on the images of the eighty-one measurement targets in nine rows and nine columns are displayed. If the above condition is not satisfied, a process of simply displaying the calculation results based on the images of the forty-nine measurement targets in seven rows and seven columns as measurement results is maintained. The process continues until the lens LE is widely moved (which can be recognized by a change in the prism diopter) or until a new lens is mounted on the nosepiece 4. However, rechecking and determination may be performed every few seconds even when the lens LE is not moved.

The present invention is not limited to the preferred embodiment described above. The cylinder power used for the determination in the step S-2 and the condition used in the step S-4 may be changed as appropriate. In the description above, the number of the images of the measurement targets to be measured is switched between the forty-nine measurement targets in seven rows and seven columns and the eighty-one measurement targets in nine rows and nine columns around the optical axis L1. However, it is not limited to those numbers. For example, twenty-five measurement targets in five rows and five columns around the pinhole H5 on the measurement optical axis L1 may normally be measured, and when the cylinder power is the predetermined weak diopter δcD or less, a larger number of measurement targets may be measured by expanding the measurement region. Alternatively, measurement targets on a circumference of a circle having a diameter of 2 mm around the measurement optical axis L1 may be normally measured, and when the cylinder power is the predetermined weak diopter δcD or less, measurement targets arranged within a larger diameter may be measured. Still alternatively, the number of the measurement targets may be switched among the twenty-five measurement targets in five rows and five columns, the forty-nine measurement targets in seven rows and seven columns, and the eighty-one measurement targets in nine rows and nine columns in a stepwise manner according to the cylinder power.

The calculation (the second calculation) of the optical characteristics which is performed by expanding the measurement region and increasing the number of the measurement targets in accordance with the power of the lens LE is used in the foregoing description. The second calculation is also effective to use if there is a scratch or soil on the lens LE. Of the images of the measurement targets in a small region (forty-nine measurement targets in seven rows and seven columns) around the measurement optical axis L1, if the number of the images of the measurement targets which are detected properly is less than a predetermined number or a fixed rate (40%, 50% and other percentages) due to a lack of light intensity or defective shapes of the images of the measurement targets caused by a scratch or soil on the lens LE, measurement results tend to vary, causing unfavorable reliability of measurement accuracy. In this case, the control part 40 displays measurement results obtained by the second calculation based on the eighty-one measurement targets in nine rows and nine columns on the display 2. Stability of the measurement results can be improved by increasing the number of the images of the measurement targets which are detected properly. In addition, improvement of measurement accuracy is attainable. When the number of the images of the measurement targets detected properly satisfies the predetermined number or the fixed rate, the control part 40 simply displays the measurement results calculated based on the images of the forty-nine measurement targets in seven rows and seven columns on the display 2.

In addition, it is possible to select only targets having uniform values by obtaining standard deviations of the respective measurement values when calculating the measurement value. Because the calculation of the optical characteristics can be performed in a shorter time than a detection process of the images of the measurement targets, selection of the measurement targets to be adopted or the measurement targets to be rejected is performed after respective detections of the measurement targets, and this procedure is repeated until the standard deviation reaches a required level. Accordingly, stable measurement results can be obtained without prolonging measurement time.

The switching from the measurement results based on the forty-nine measurement targets in seven rows and seven columns to the measurement results based on the eighty-one measurement targets in nine rows and nine columns is not necessarily applicable when the lens meter is used at a lens manufacturer and others. Therefore, it is preferable that selection between applying the switching function and using the measurement results based on forty-nine measurement targets in seven rows and seven columns in a conventional manner can be made by a selection switch provided on the display 2.

In the second calculation according to the preferred embodiment, the optical characteristics are calculated by expanding the measurement region and increasing the number of the measurement targets. However, only either of them may be expanded or increased. For example, the forty-nine measurement targets in seven rows and seven columns in a small region in the vicinity of the measurement optical axis L1 may be measured in the first calculation, and in the second calculation, even though the measurement region is expanded to the region of the eighty-one measurement targets in nine rows and nine columns, calculation of the optical characteristics may be performed on the forty-nine measurement targets, which is the same quantity as the first calculation, by calculating alternate targets instead of all the eighty-one measurement targets in order to avoid prolonging calculation time. An example in which only the number of the measurement targets is increased is described. The first calculation may be performed on twenty-five alternate measurement targets in the measurement region of the forty-nine measurement targets in seven rows and seven columns, and in the second calculation, all the measurement targets within the measurement region of the forty-nine measurement targets in seven rows and seven columns may be calculated. Although it is preferable to expand the measurement region and to increase the number of measurement targets in the second calculation similarly to the preferred embodiment, expanding or increasing only either of them can still bring more stable results than those of the conventional first calculation.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter capable of measuring optical characteristics of a single vision lens to be measured, the lens meter comprising:
   a measurement optical system including
      a light source arranged to emit a measurement light bundle,
      a target panel having a plurality of measurement targets which are arranged in a predetermined pattern around a measurement optical axis, the measurement targets having at least first measurement targets in a first region in the vicinity of the measurement optical axis and second measurement targets in a second region outside the first region, and
      a photodetector arranged to photo-receive the measurement light bundle passing through the lens and the target panel;
   selecting means for making selection between a mode of measuring a single vision lens and a mode of measuring a progressive power lens;
   calculation means for calculating the optical characteristics including cylinder power and sphere power of the lens, which is arranged to calculate in the single vision lens measurement mode first optical characteristics including first cylinder power and first sphere power of the lens based on a detection result of the first measurement targets by the photodetector, and calculate second optical characteristics including second cylinder power and second sphere power of the lens based on a detection result of the first and second measurement targets by the photodetector;
   a display; and
   display control means for controlling display on the display, which is arranged to control in the single vision lens measurement mode the display to display the second optical characteristics as the optical characteristics of the lens if one of a calculation result by the calculation means and the detection result by the photodetector satisfies a predetermined condition, and control the display to display the first optical characteristics as the optical characteristics of the lens unless one of the calculation result by the calculation means and the detection result by the photodetector satisfies the predetermined condition.

2. The lens meter according to claim 1, wherein the display control means controls in the single vision lens measurement mode the display to display the second optical characteristics as the optical characteristics of the lens in one of a case where the first cylinder power is a predetermined weak diopter and a case where the first cylinder power is the predetermined weak diopter and the first sphere power is a predetermined weak diopter.

3. The lens meter according to claim 1, wherein the display control means controls in the single vision lens measurement mode the display to display the second optical characteristics as the optical characteristics of the lens if differences between the first optical characteristics and the second optical characteristics are within a permissible range.

4. The lens meter according to claim 1, wherein the display control means controls in the single vision lens measurement mode the display to display the second optical characteristics as the optical characteristics of the lens unless the number of the first measurement targets detected property by the photodetector satisfies one of a fixed rate and a predetermined number.

5. A lens meter capable of measuring optical characteristics of a single vision lens to be measured, the lens meter comprising:
   a measurement optical system including
      a light source arranged to emit a measurement light bundle,
      a target panel having a plurality of measurement targets which are arranged in a predetermined pattern around a measurement optical axis, the measurement targets having at least first measurement targets in a first region in the vicinity of the measurement optical axis and second measurement targets in a second region outside the first region, and
      a photodetector arranged to photo-receive the measurement light bundle passing through the lens and the target panel;
   selecting means for making selection between a mode of measuring a single vision lens and a mode of measuring a progressive power lens; and
   calculation means for calculating the optical characteristics of the lens, which is arranged to calculate in the single vision lens measurement mode cylinder power of the lens based on a detection result of the first measurement targets by the photodetector, calculate the optical characteristics of the lens based on the detection result of the first measurement targets if the cylinder power is stronger than a predetermined power, and calculate the optical characteristics of the lens based on a detection result of the first and second measurement targets if the cylinder power is weaker than the predetermined power.

6. The lens meter according to claim 5, wherein the calculation means is arranged to calculate the optical characteristics of the lens by performing analysis based on a detection position of each of the measurement targets using a ray tracing method.

7. A lens meter capable of measuring optical characteristics of a single vision lens to be measured, the lens meter comprising:
   a measurement optical system including
      a light source arranged to emit a measurement light bundle,
      a target panel having a plurality of measurement targets which are arranged in a predetermined pattern around a measurement optical axis, the measurement targets having at least first measurement targets in a first region in the vicinity of the measurement optical axis and second measurement targets in a second region outside the first region, and
      a photodetector arranged to photo-receive the measurement light bundle passing through the lens and the target panel;

selecting means for making selection between a mode of measuring a single vision lens and a mode of measuring a progressive power lens; and calculation means for calculating the optical characteristics of the lens, which is arranged to calculate in the single vision lens measurement mode first cylinder power and first sphere power of the lens based on a detection result of the first measurement targets by the photodetector, calculate second cylinder power and second sphere power of the lens based on a detection result of the first and second measurement targets by the photodetector, calculate the optical characteristics of the lens based on the detection result of the first measurement targets if the first cylinder power is stronger than a predetermined power, and calculate the optical characteristics of the lens based on the detection result of the first and second measurement targets if the first cylinder power is weaker than the predetermined power and a difference between the first sphere power and the first cylinder power and a difference between the second sphere power and the second cylinder power are within a permissible range.

8. The lens meter according to claim 7, wherein the calculation means is arranged to calculate the optical characteristics of the lens by performing analysis based on a detection position of each of the measurement targets using a ray tracing method.

* * * * *